United States Patent Office 3,337,482
Patented Aug. 22, 1967

3,337,482
ETHYLENE-VINYL ACETATE COPOLYMER
PAPER COATING COMPOSITION
Hiroshi Watanabe and Seiichi Takahashi, Kamakura, Kanagawa Prefecture, and Akira Shingyochi and Naotaka Watanabe, Yokohama, Kanagawa Prefecture, Japan, assignors to Toyo Koatsu Industries, Incorporated, Tokyo, Japan, a corporation of Japan
No Drawing. Filed Sept. 20, 1965, Ser. No. 488,785
Claims priority, application Japan, Sept. 24, 1964, 39/53,983
17 Claims. (Cl. 260—8)

This invention relates to a paper coating composition prepared by mixing a pigment and assistant with a binder comprising a copolymeric emulsion comprised mostly of polymerized ethylene and vinyl acetate.

An object of the present invention is to provide a paper coating composition to give paper such excellent properties for printing adaptability as gloss, whiteness, light resistance, wet rubbing strength and picking and a proper stiffness as a coating material for producing such fine printing paper as art paper.

It has already been proposed to coat the surface of sized or nonsized paper, such as sulfite pulp paper, with a coating composition consisting of the three elements of a pigment, binder and assistant in order that the pigment may be secured to the surface of the paper to be coated, the surface of the paper may be made smoother and other properties, such as gloss, whiteness and printability, may be improved in printing paper, such as art paper. It is therefore evident that the quality of printing paper depends on the properties of the coating composition.

Generally the pigment in the paper coating composition is used to increase the smoothness, whiteness and ink receptivity. As a typical pigment there is generally used clay, calcium carbonate, titanium dioxide, barium sulfate, zinc oxide or titanium white. As the binder there is used casein, starch, soybean protein, synthetic rubber latex or polyvinyl alcohol so that the pigment may be secured to the material paper to be coated and the printability may be elevated. Such binder is generally used singly or as mixtures. Further, the quality of the paper coating composition depends to a great extent on the characteristics of the binder.

As the assistant there is used a dispersing agent, an antifoaming agent, and/or a leveling agent. The dispersing agent is intended to peptize the pigment, help the dispersion of the constituent substances in the paper coating composition and deposit them uniformly on the material paper to be coated. As the dispersing agent there is generally used such complex phosphate compounds as sodium metaphosphate, sodium pyrophosphate or sodium tripolyphosphate. The antifoam agent is intended to prevent foaming in coating. Typical antifoam agents include octyl alcohol, silicone oil or pine oil. The leveling agent is intended to maintain the smoothness of the surface of the paper when coated. Any surface active agent can be used as a leveling agent.

Conventional fine printing paper is made by coating paper with a coating composition prepared from the abovementioned three main constituents. The properties of the printing paper depend largely on the kind of the binder in the paper coating composition. As already described, such natural binders as casein or starch have been mostly used singly or as mixtures. However, recently synthetic rubber latices, such as styrene-butadiene copolymer latex or methylmethacrylate-butadiene copolymer latex, have come to be used together with the natural binder, such as those mentioned above, because it had been found that such synthetic rubber latices improve the softness and gloss of the coated paper, increase its wet rubbing strength, prevent the generation of picking and improve high speed printing. As a typical example of such binder, there are the casein-synthetic rubber latex or starch-synthetic rubber latex mixtures.

However, paper coating compositions containing a binder comprising a synthetic rubber latex and a natural binder have many defects as described below:

(1) In preparing such paper coating compositions, unless the ionic charge, if any, present in the pigment and the hydrogen ion concentration in the binder are at a fixed balance point, the tendency of the viscosity of the composition to increase will be little. Therefore, in order to reach this fixed balance point, the hydrogen ion concentration must be strictly adjusted with alkali, such as ammonia. Furthermore, the degree of viscosity increase is different depending on the origin of the clay or other pigment used. Under such circumstances, it is very difficult to control viscosity and prepare a suitable paper coating composition.

(2) Even if the hydrogen ion concentration is properly adjusted to give the desired viscosity, the paper coating composition will tend to further increase in viscosity with the lapse of time. Therefore, when coating paper with said composition by means of a coating machine, the movement of said composition to the material paper from the coating machine is not smooth. Consequently, it is very difficult to uniformly coat the paper with said composition especially when using a binder comprising a mixture of such synthetic rubber latex as mentioned above with starch.

(3) The coated paper obtained by using a binder prepared from both starch and a synthetic rubber latex is not adapted to high speed printing because of the generation of picking. Furthermore, its wet rubbing strength is so low as to be substantially zero. Therefore, it is not adapted to offset printing and it is difficult to make high quality paper to be used for such printing.

(4) When the coated paper obtained by using a binder containing a synthetic rubber latex is exposed to the sun or fluorescent lamps, due to the unsaturated bond present in the synthetic rubber latex, the binder will be denatured with the lapse of time, the surface of the coated paper will become yellow, its gloss will reduce and its stiffness will vary and reduce. Therefore, special care must be taken in preserving the coated paper after printing and this is a great cause in reducing the commodity value of such coated paper.

The present invention provides paper coating compositions in which the above-mentioned defects are greatly reduced or eliminated and, in accomplishing these improvements, uses as binder an emulsion of an ethylene-vinyl acetate copolymer, i.e., a copolymer of ethylene and vinyl acetate or a copolymer of ethylene, vinyl acetate and an ethylenically unsaturated mono- or dicarboxylic acid. The compositions of this invention have the following advantages which have not been achieved heretofore:

(1) In preparing the paper coating compositions of the present invention, it is not necessary at all to adjust the hydrogen ion concentration, because the viscosity of any conventionally used pigment, including clay of any origin, specifically will not increase and the viscosity of the prepared composition will not substantially increase. Therefore, in coating the paper with said compositions, it is easy to adjust and control the viscosity.

(2) The viscosity of the compositions will not increase with the passage of time, the paper coated with the compositions will have no substantial practical disadvantage by the generation of picking and the wet rubbing strength of the coated paper will be much higher than in the case of using such conventional binder as casein, soybean protein, synthetic rubber latex, polyvinyl alcohol together with starch, or mixtures thereof.

(3) The stiffness of the coated paper can be readily varied by varying within the range hereinafter set forth the content of the ethylene in the ethylene-vinyl acetate copolymer used. Therefore, the fact that the stiffness of the coated paper can be controlled and maintained at any desired value is a very important advantage to the commodity value of paper coated with our compositions.

(4) The fluid characteristics of the compositions of the present invention can be properly varied by varying the content of the ethylenically unsaturated mono- or dicarboxylic acid employed in the copolymer used as binder. Therefore, a composition having fluid characteristics especially adapted to the surface of the particular paper to be coated can be provided. As a result, high quality paper coated uniformly with the composition are obtained.

(5) The resulting coated paper is extremely high in whiteness. When it is exposed to the sun fluorescent lamps for a long time, the surface of the coated paper will not discolor nor will it lose any gloss at all nor will its stiffness vary at all.

(6) Paper coated with the compositions of the present invention is so improved in picking value that it can be used on high speed rotary printing presses.

The present invention provides a paper coating composition in which the binder is composed mostly of an emulsion of a copolymer made from 0 to 5% by weight of an ethylenically unsaturated mono- or dicarboxylic acid, 2 to 30% by weight ethylene and 98 to 70% by weight vinyl acetate. The novel compositions contain such pigments as are contained in conventional paper coating compositions and suitable assistants dispersed therein.

The amount of polymerized ethylene in the ethylene-vinyl acetate copolymer is defined because, when the polymerized ethylene content is less than 2% by weight, the stiffness of the coated paper quickly decreases, the pigment is likely to peel off the coated paper, especially if the paper is thick, and the coated paper is no longer adapted for high quality use. Furthermore, as the polymerized ethylene content becomes 30% by weight, the stiffness of the coated paper increases but the adhesiveness of the binder decreases and, as a result, the coated paper tends to generate a little picking which, however, is not enough to present a substantial practical problem. When the 30% limit is exceeded, the generation of picking becomes so great that peeled parts are produced in the printed drawn line and not only is the commodity value of the paper lost but also the peeled parts stain and contaminate the printing surface and blanket, mix into the ink, and otherwise indirectly deteriorate the printed result and the efficiency of the printing operation is reduced. Therefore, paper coated with the paper coating composition in which an emulsion of an ethylene-vinyl acetate copolymer containing more than 30% by weight of polymerized ethylene is used as a binder has no practical value as printing paper.

It is also a gerat advantage of the present invention that the stiffness to be given to the coated paper can be varied by varying, within the above-mentioned limits, the polymerized ethylene content in the copolymer used in the binder. In addition, the use of 5% or less of the ethylenically unsaturated mono- or dicarboxylic acid in the copolymer serves to regulate the fluid characteristics of the paper coating composition made from the copolymer. That is to say, when the ethylenically unsaturated mono- or dicarboxylic acid is used, the viscosity of paper coating compositions made therewith will not increase and the compositions will not coagulate but will be capable of being very uniformly applied.

Furthermore, when the unsaturated mono- or dicarboxylic acid copolymerized in the ethylene-vinyl acetate copolymer used in the present invention is up to 5% by weight, the viscous fluidity given to the paper coating composition will be reduced in response to the amount of the unsaturated mono- or dicarboxylic acid. But, when it is more than 5%, the viscous fluidity will not be substantially changed. Therefore, as a practical matter, it is preferable to use in the ethylene-vinyl acetate copolymer of the novel compositions high or low amounts of the ethylenically unsaturated mono- or dicarboxylic acid for paper having a coarse or smooth surface, respectively.

The ethylenically unsaturated mono- or dicarboxylic acid useful in the present invention is represented by the general formula

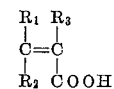

wherein $R_1$, $R_2$ and $R_3$ are all hydrogen, or any one of $R_1$, $R_2$ and $R_3$ is an alkyl or carboxyl group and the remaining are hydrogen. It is preferred that such acids have not more than 8 carbon atoms. Typical examples of such acids are acrylic acid, methacrylic acid, maleic acid, citraconic acid, fumaric acid and crotonic acid.

In using the ethylene-vinyl acetate copolymer emulsion in the present invention as a binder, it is possible to use it together with such well known binders which have been conventionally used as starch, casein or polyvinyl alcohol. The amount of the paper coating composition of the present invention to be used to coat paper is substantially the same as that of any conventional paper coating composition. But the amount of the above-described binder used in the present invention is generally smaller than in any conventional case. The paper coating composition of the present invention comprises 3 to 30 parts of binder per 100 parts of pigment. Further, 0.1 to 5 parts of such assistant as has been already described and conventionally used may be added to the composition.

As evident from what has been already described, there are practical disadvantages in using conventional binders alone, for example, starch, casein or polyvinyl alcohol. Therefore, it is general practice to also use a synthetic rubber latex. Besides the defects of such use as have been described, it is usual to use an amount of synthetic rubber latex solids equal to about ⅓ to ½ the total solids of the binder. As the amount of the synthetic rubber latex is increased, such defects of the synthetic rubber latex as have been already described will begin to appear in the coated paper. When about ½ the total amount is exceeded, the advantages and disadvantages cancel each other and, as a result, the significance of adding the synthetic rubber latex is lost. Below about ⅓, little effect of using the synthetic rubber latex can be expected.

The ethylene-vinyl acetate copolymer emulsion of the present invention can be used alone as a binder or together with other conventional binders. When casein, starch or polyvinyl alcohol is used together with the ethylene-vinyl acetate copolymer emulsion, there will be no such cancellation of the effects as in the use of the above-mentioned conventional binder. Therefore, there is no need of observing an upper limit on the amount of the ethylene-vinyl acetate copolymer emulsion used. The lower limit of the ethylene-vinyl acetate copolymer solids of the emulsion used is ⅙ the solids of the total binder so that the beneficial effects of such use may be obtained. When using the ethylene-vinyl acetate copolymer emulsion together with another binder, such as a synthetic rubber latex, the amount of the solids of said copolymer emulsion can be ½ the amount of the total solids and such amounts of said copolymer emulsion will greatly improve the properties of the resulting coating composition. When known binders are used, the preferable range of solids of the ethylene-vinyl acetate copolymer emulsion is ⅙ to ⅔ of the total binder solids used. More than that may well be used.

The pigment and binder in the paper coating compositions of the present invention are indispensable. However, as already described, such conventionally used assistants as dispersing agents, antifoaming agents and leveling agents may be properly added depending on the kind of pigment being employed. The amount of such assistant to be used can be less than half the amount required for any conventional composition.

In the present invention, 0.5 to 5% by weight of the binder solids can be replaced with an N-methylol group-containing compound to further improve the wet rubbing strength of paper coated therewith. Suitable methylol group-containing compounds are represented by any of the general Formulae I to IV.

tetramethylolmelamine, pentamethylolmelamine, hexamethylolmelamine, N-methoxymethyl N'-methylolmelamine, dimethylolethylene urea, monomethylol urea, dimethylol urea, dimethylolethyltriazone, dimethylolhydroxyethyltriazone, tetramethylolacetylene diurea, dimethylolpropylene urea, dimethyloldihydroxyethylene urea, N-butoxymethyl N'-methylol urea and N-methoxymethyl N'-methylol urea.

For the pigment contained in the paper coating composition of the present invention there is used any conventionally used pigment singly or mixed. However, the fluid characteristics of the composition of the present invention will not vary with the kind of pigment as is the disadvantage when using a conventional rubber latex as a binder. For the assistant contained in the paper coating composition of the present invention there can be used the above-mentioned conventional assistants. For the leveling agent to be added to the composition of the present invention there can be used any conventionally used surface active agent. Especially, anionic surface active agents and nonionic surface active agents are preferable. In preparing the paper coating composition, if the above-mentioned surface active agent is dispersed in the pigment in advance, there will be advantages in that the preparation will be simplified and in that high miscibility will be obtained.

The process for preparing the paper coating composition of the present invention is not substantially different from the procedures used in preparing conventional paper coating compositions such as those already described.

The most general process shall be explained in the following. First of all, 100 parts of the pigment are mixed in a kneader or blender. About 20 parts of an aqueous solution containing 0.1 to 0.5 part of a dispersing agent, such as sodium tripolyphosphate, and 0.1 to 0.05 part of a leveling agent, such as sodium alkylbenzenesulfonate, are added to the pigment. The mixture is further kneaded. Then, 3 to 30 parts of the mixed binder, depending on the character to be given to the paper to be coated, are added to the mixture. The mixture is then diluted with

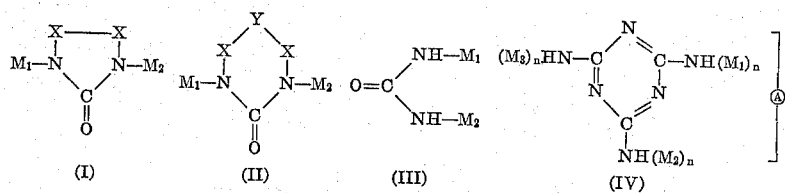

(I)    (II)    (III)    (IV)

wherein (a) X is >CH₂ or >CHOH;
(b) X—X can be

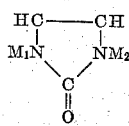

(c) Y is >CH₂ or RN< wherein R is lower alkyl or hydroxy lower alkyl;
(d) M₁ is —CH₂OH;
(e) each of M₂ and M₃ is H or a —CH₂OR¹ group wherein R¹ is a lower alkyl group and n is 1 or 2.

Typical examples of these compounds are monomethylolmelamine, dimethylolmelamine, trimethylolmelamine, water to a concentration adapted for the coating machine to be used and is further mixed well.

Paper is coated with the thus-obtained mixed composition at a concentration in a wide range, for example, about 20 to 70% solids in water depending on the coating equipment to be used, for example, a roll coater or a knife coater. In preparing the paper coating composition of the present invention, it is not necessary to adjust the hydrogen ion concentration. In case casein is used as a part of the binder, in mixing and kneading the binder with the pigment, if a small amount of ammonia is added to the binder, the dissolution of the casein will be assisted.

Any conventional paper can be coated in the present invention. That is to say, paper to be coated with the coating composition of the present invention is paper made through the general steps of beating such single or mixed raw material pulp as a ground pulp, semichemical pulp, sulfite pulp, kraft pulp or brown ground pulp, sizing the pulp, adding known fillers to the pulp, coloring and refining the resulting mixture and making it into paper. A gloss is given to the surface of the paper by means of calender rolls or the like. Nothing is deposited on the surface. Only fibers are exposed on the surface.

The method of applying the paper coating composition of the present invention is exactly the same as any suitable conventional method. The amount of the coating composition of the invention applied per unit area of the material paper can be the same as in the case of the conventional paper coating. Typical coating methods are on-machine coating, size press coating, off-machine coating and board coating methods. There can be used such well known coaters as a roll coater, brush coater, sizing press, printing coater, casting coater, air knife coater, champion machine coater, blending coater and combination coater. The paper coating composition of the present invention may be prepared and applied according to the operating specification of the coater for the object of the coated paper.

The ethylene-vinyl acetate copolymer emulsion to be used in the present invention can be obtained by such known treatment as, for example, in Japanese Patent 420,428. However, the emulsion obtained by the following treatment has an especially favorable effect on the attainment of the objects of the present invention. 1000 parts of vinyl acetate (to which is added unsaturated ethylenic mono- or dicarboxylic acid if used), 45 to 90 parts of such nonionic surface active agent as polyoxyethylene oleyl phenyl ether or polyoxyethylene lauryl phenyl ether, 5 to 10 parts of lauryl alcohol sulfate, 1000 parts of distilled water, 0.5 to 1 part of sodium hydrogen sulfite as a catalyst (1) and 0.5 to 2 parts of sodium carbonate as a hydrogen ion concentration adjusting agent are put into a reaction chamber and ethylene is well saturated under a pressure of 10 to 80 kg./cm.$^2$ while they are being well stirred at 40 to 60° C. Then an aqueous solution prepared by dissolving 0.5 to 5 parts of potassium persulfate as a catalyst (2) in 200 parts of water is gradually continuously added under pressure into the reaction chamber over the first four hours of the reaction time. When the above-mentioned aqueous solution prepared by dissolving 0.5 to 5 parts of potassium persulfate is added into the reaction chamber, a reaction will start. The reaction is carried out under the conditions of a reaction temperature of 40 to 60° C. and a reaction pressure (ethylene pressure) of 10 to 80 kg./cm.$^2$. In 10 hours after the reaction starts, an ethylene-vinyl acetate copolymer emulsion of a solids concentration of about 40 to 55% by weight will be obtained. The content of ethylene in the obtained copolymer will be related to the ethylene pressure used. When the ethylene pressure is 10 kg./cm.$^2$, the content of ethylene in the copolymer will be about 2% by weight. When the ethylene pressure is 80 kg./cm.$^2$, the content of ethylene in the copolymer will be about 30% by weight. The content of ethylene in the copolymer in this range will be linearly proportional to the ethylene pressure. Furthermore, when an ethylenically unsaturated mono- or dicarboxylic acid is used, the amount of vinyl acetate put into the reaction chamber may be correspondingly reduced by the number of mols of the unsaturated mono- or dicarboxylic acid used. In the emulsion obtained by such method, the polymeric solids comprise substantially uniform spheres of diameters of 0.1 to 0.3$\mu$. The emulsion is highly stable on standing.

The reason why the composition of the present invention is more effective than any conventional composition is that, as mentioned above, an ethylene-vinyl acetate copolymer emulsion having a composition ratio in the specific range as set forth is used as a binder. Such paper coating compositions of the present invention are simple to prepare. In the case of coating paper with such compositions by means of a coating machine, there will be no inconvenience in handling due to viscosity or the like and therefore the workability of the composition is high. Furthermore, after the paper coating compositions are prepared, there is substantially no tendency of the viscosity to increase or otherwise change with the lapse of time and the compositions are stable. Therefore, the paper coated with the compositions of this invention have no such defects found in the conventional paper coating compositions as described hereinabove and have numerous excellent performance characteristics. Thus, the paper coating compositions of the present invention are very useful in industry.

The subject matter and working of the present invention shall be made clearer with the following examples wherein parts and percentages are by weight unless otherwise noted.

*Example 1*

Each of the several paper coating compositions indicated in Table 1 where prepared as follows. A mixture of 75 parts of kaolin clay produced in Georgia, U.S.A., 25 parts of fine powdery calcium carbonate having a particle size of 0.1 to 5$\mu$ and 100 parts of distilled water was kneaded by means of a kneader for about 30 minutes. 0.2 part of sodium tripolyphosphate was then added to the mixture and the mixture was mixed and kneaded for another 10 minutes. To this mixture were added 15 parts, based on solids, of the ethylene-vinyl acetate copolymer emulsion constituted as shown in Table 1 in the cases where the copolymer was used alone as binder or 7 parts, based on solids, of said copolymer emulsion and 8 parts, based on solids, of any known binder as indicated in the cases where the copolymer was used together with such known binder. The mixture was mixed and kneaded, while adding water, if necessary, to prepare a paper coating composition to form a slurry having a solids concentration of 50% by weight.

Commercial high quality unbleached sulfite paper having a weight of 84 g./m.$^2$ and a sized degree of 58 seconds was hand-painted on one surface with each of the paper coating compositions prepared above by means of applicator bars having a clearance of 1 micron so that the paper was coated with 20 g. of the solids of each paper coating composition per square meter of the paper. The paper was dried at the normal temperature for 2 hours and then with hot air at 80° C. Then the treated paper was passed 4 times by nipping through a testing super calender at a temperature of 70° C., roll pressure of 100 kg./cm.$^2$, water absorption of the treated paper of 6 to 8% by weight and speed of 25 m./min. The results of the measurements of the viscosity of the applied paper coating composition and the whiteness, light resistance, yellow change degree, wet rubbing strength, picking value and stiffness of the treated paper are compiled and shown in run numbers 1 to 27 (of which 21 to 22 are of comparisons) in Table 1.

Further, as comparisons, such styrene-butadiene and methylmethacrylate-butadiene copolymer emulsions of generally used conventional composition ratios as are shown in Table 1 were used instead of the ethylene-vinyl acetate copolymer emulsions in the manner as described above, to form paper coating compositions using the same amounts of exactly the same pigment and assistant as in the case of each of the above-mentioned run numbers 1 to 27 in substantially the same processes as in each of said run numbers. The same type of paper was coated using the same coating process as in the case of each of the above-mentioned run numbers 1 to 27. These results are also compiled and shown in run numbers 28 to 31.

TABLE 1

| Run No. | Solid substances in the binders | | | | Paper coating compositions | |
|---|---|---|---|---|---|---|
| | Ethylene-Vinyl acetate copolymer composition in percent by weight | | | Additional binders used | Viscosity in centipoises at the time of the preparation (note 1) | Viscosity in centipoises after the preparation (note 2) |
| | Ethylene | Vinyl acetate | Acrylic acid | | | |
| 1 | 5 | 95 | 0 | None | 287 | 285 |
| 2 | 5 | 94 | 1 | ---do--- | 253 | 265 |
| 3 | 15 | 85 | 0 | ---do--- | 247 | 235 |
| 4 | 15 | 84 | 1 | ---do--- | 231 | 230 |
| 5 | 5 | 95 | 0 | Oxidized starch | 629 | 630 |
| 6 | 5 | 95 | 0 | Casein | 526 | 532 |
| 7 | 5 | 95 | 0 | Soybean protein | 458 | 461 |
| 8 | 5 | 95 | 0 | Polyvinyl alcohol | 360 | 360 |
| 9 | 5 | 94 | 1 | Oxidized starch | 611 | 610 |
| 10 | 5 | 94 | 1 | Casein | 480 | 482 |
| 11 | 5 | 94 | 1 | Soybean protein | 446 | 450 |
| 12 | 5 | 94 | 1 | Polyvinyl alcohol | 349 | 351 |
| 13 | 15 | 85 | 0 | Oxidized starch | 592 | 602 |
| 14 | 15 | 85 | 0 | Casein | 456 | 458 |
| 15 | 15 | 85 | 0 | Soybean protein | 436 | 443 |
| 16 | 15 | 85 | 0 | Polyvinyl alcohol | 332 | 333 |
| 17 | 15 | 84 | 1 | Oxidized starch | 531 | 542 |
| 18 | 15 | 84 | 1 | Casein | 432 | 435 |
| 19 | 15 | 84 | 1 | Soybean protein | 403 | 400 |
| 20 | 15 | 84 | 1 | Polyvinyl alcohol | 310 | 313 |
| 21 | 35 | 65 | 0 | Casein | 421 | 425 |
| 22 | 35 | 64 | 1 | ---do--- | 410 | 411 |
| 23 | 2 | 98 | 0 | ---do--- | 490 | 495 |
| 24 | 2 | 97 | 1 | ---do--- | 423 | 421 |
| 25 | 2 | 95 | 3 | ---do--- | 352 | 354 |
| 26 | 2 | 93 | 5 | ---do--- | 298 | 299 |
| 27 | 2 | 91 | 7 | ---do--- | 289 | 290 |
| 28 | (1) | (2) | | Oxidized starch | 1,121 | 2,351 |
| 29 | (1) | (2) | | Casein | 890 | 1,992 |
| 30 | (3) | Butadiene 40 | | Oxidized starch | 1,740 | 2,990 |
| 31 | (3) | (2) | | Casein | 920 | 1,365 |

| Run No. | Properties of the coated paper | | | | | | | |
|---|---|---|---|---|---|---|---|---|
| | Whiteness in percent (note 3) | Gloss degree in percent (note 4) | Light resistance in percent (note 5) | Yellowing degree (note 6) | Wet rubbing strength (times) (note 7) | Picking value (note 8) | Stiffness (note 9) | Remarks |
| 1 | 79.6 | 34.2 | 98.2 | No change | >10 | 188 | 141 | |
| 2 | 78.7 | 35.6 | 96.3 | ---do--- | ---do--- | 192 | 139 | |
| 3 | 86.5 | 37.9 | 97.2 | ---do--- | ---do--- | 187 | 127 | |
| 4 | 87.7 | 32.3 | 98.3 | ---do--- | ---do--- | 188 | 125 | |
| 5 | 78.7 | 33.1 | 94.2 | ---do--- | ---do--- | 170 | 129 | |
| 6 | 82.0 | 32.8 | 96.6 | ---do--- | ---do--- | 163 | 133 | |
| 7 | 85.1 | 29.3 | 98.3 | ---do--- | ---do--- | 188 | 135 | |
| 8 | 84.3 | 27.1 | 95.8 | ---do--- | ---do--- | 172 | 135 | |
| 9 | 87.3 | 34.5 | 96.1 | ---do--- | ---do--- | 171 | 136 | |
| 10 | 81.9 | 29.8 | 96.4 | ---do--- | ---do--- | 183 | 134 | Examples of the present invention. |
| 11 | 79.0 | 31.5 | 95.0 | ---do--- | ---do--- | 173 | 136 | |
| 12 | 82.2 | 31.5 | 94.1 | ---do--- | ---do--- | 177 | 137 | |
| 13 | 79.8 | 32.9 | 96.0 | ---do--- | ---do--- | 161 | 121 | |
| 14 | 85.6 | 31.0 | 96.0 | ---do--- | ---do--- | 175 | 122 | |
| 15 | 87.6 | 31.3 | 96.3 | ---do--- | ---do--- | 165 | 126 | |
| 16 | 87.5 | 32.3 | 96.2 | ---do--- | ---do--- | 165 | 123 | |
| 17 | 81.7 | 30.9 | 94.5 | ---do--- | ---do--- | 170 | 124 | |
| 18 | 84.6 | 32.8 | 94.7 | ---do--- | ---do--- | 190 | 128 | |
| 19 | 88.7 | 34.0 | 96.7 | ---do--- | ---do--- | 185 | 119 | |
| 20 | 88.1 | 34.4 | 95.5 | ---do--- | ---do--- | 171 | 121 | |
| 21 | 79.9 | 29.9 | 94.9 | ---do--- | ---do--- | 131 | 112 | Comparisons. |
| 22 | 81.2 | 29.6 | 92.7 | ---do--- | ---do--- | 129 | 114 | |
| 23 | 82.3 | 32.7 | 96.6 | ---do--- | ---do--- | 141 | 172 | |
| 24 | 85.9 | 31.9 | 95.4 | ---do--- | ---do--- | 142 | 178 | Examples of the present invention. |
| 25 | 84.2 | 32.8 | 93.2 | ---do--- | ---do--- | 188 | 172 | |
| 26 | 83.1 | 33.1 | 93.2 | ---do--- | ---do--- | 189 | 168 | |
| 27 | 83.7 | 32.4 | 94.5 | ---do--- | ---do--- | 181 | 172 | |
| 28 | 75.1 | 18.3 | 92.9 | Discolored in 12 hours | 5 | 132 | 136 | |
| 29 | 72.3 | 19.6 | 91.3 | ---do--- | 6 | 143 | 131 | Comparisons. |
| 30 | 75.3 | 21.2 | 89.3 | ---do--- | 6 | 139 | 137 | |
| 31 | 73.9 | 23.5 | 89.6 | ---do--- | 4 | 121 | 135 | |

[1] Styrene 60.   [2] Butadiene 40.   [3] Methyl-methacrylate 60.

The respective properties of the coated paper in Table 1 were measured by the following methods:

Notes 1 and 2: Measured at a rotating speed of 60 r.p.m. at 20° C. by means of a viscosimeter. In note 2 the viscosity was measured 24 hrs. after preparation.

Note 3: Measured with a reflectometer in accordance with ASTM D985–48T.

Note 4: Measured in accordance with ASTM D1223–52T.

Note 5: The sample was irradiated with ultraviolet rays for 24 hours with a Fade-O-meter and the ratio of the whiteness after the irradiation to the whiteness before the irradiation is represented in percent.

Note 6: The sample was irradiated with ultraviolet rays for 24 hours with a Fade-O-meter and the degree of yellowing was judged with the naked eye.

Note 7: Measured by a finger test wherein black paper was placed beneath the coated paper being tested so as to be a little displaced out from under the coated paper. 0.5 ml. of water was dropped on the coated paper and, after 15 seconds, the paper was rubbed with a finger. The number of rubbing times until the white pigment peeled off and appeared on the surface of the black paper below it is shown.

Note 8: The coated paper was tested with No. 4 ink under a printing roll pressure of 30 kg./cm.$^2$ by means of a printability testing machine and the distance of the strip off of which the printing ink peeled is shown in Table 1.

Note 9: Measured with a stiffness tester in accordance with TAPPI Standard T451m–45. The stiffness of the uncoated paper was 102.

*Example 2*

In each of runs 32 through 37, a mixture of 75 parts of kaolin clay produced in Huber, U.S.A. and 25 parts of fine powdery calcium carbonate having a particle size of 0.1 to 5μ with 100 parts of distilled water was kneaded by means of a kneader for about 30 minutes. 0.2 part of calcium tripolyphosphate was then added to the mixture and the mixture was mixed and kneaded for 10 minutes. To this mixture were added 6.5 parts of an ethylene-vinyl acetate copolymer containing 10% by weight ethylene, 89% by weight vinyl acetate and 1% by weight maleic acid and, as shown in Table 2, 0.3 part of a methylol radical-containing compound and 8 parts of starch or casein as indicated were added. The mixture was mixed and kneaded, while adding water if necessary, to prepare a paper coating composition in the form of a slurry having solids concentration of 50% by weight. Commercial high quality unbleached sulfite paper of a weight of 84 g./m.² and a sized degree of 58 seconds was hand-painted on one surface with said paper coating composition by means of applicator bars of a clearance of 1 micron so that paper is coated with 20 g. of the solid part of the above-prepared composition per square meter of the paper. The paper was dried at the normal temperature for 2 hours and then with hot air at 80° C. Then the treated paper was passed 4 times by nipping through a testing super calender at a temperature of 70° C., roll pressure of 100 kg./cm.², water absorption of the treated paper of 6 to 8% by weight and speed of 25 m./min. The results of the measurements of the viscosity of the applied paper coating composition and the whiteness, light resistance, yellow change degree, wet rubbing strength, picking value and stiffness of the treated paper are compiled and shown in Table 2. The measurements were conducted in the same manner as those in Table 1.

casein, starch, oxidized starch, soybean protein, and polyvinyl alcohol comprises ⅔ to ⅚ of said binder.

3. A coating composition as claimed in claim 1 wherein 0.5 to 5 weight percent of said binder is replaced by an N-methylol compound from the class represented by any of the general formulae

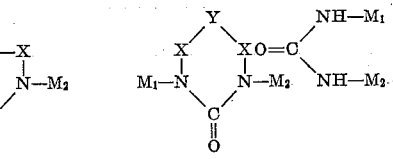

and

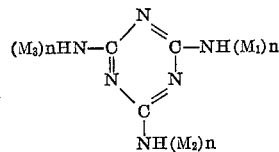

wherein (a) X is selected from $>CH_2$ and $>CHOH$;
(b) X—X can be

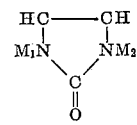

(c) Y is selected from $>CH_2$ and $RN<$ wherein R is selected from lower alkyl and hydroxy lower alkyl;
(d) $M_1$ is —$CH_2OH$;
(e) each of $M_2$ and $M_3$ is selected from H and a —$CH_2OR^1$ group wherein $R^1$ is a lower alkyl group and $n$ is an integer from 1 to 2.

4. A coating composition claimed in claim 1 wherein said aqueous mixture comprises 20 to 70% solids.

5. Paper coated with the composition claimed in claim 1.

6. Composition claimed in claim 1 wherein said acid is acrylic acid.

TABLE 2

| Run No. | Solid substances in the binders | | Paper coating compositions | | Properties of the coated paper | | | | | | |
|---|---|---|---|---|---|---|---|---|---|---|---|
| | Methylol radical containing compound | Additional binders used | Viscosity in centipoises at the time of the preparation | Viscosity in centipoises after the preparation | Whiteness in percent | Gloss degree in percent | Light resistance in percent | Yellow change degree | Wet rubbing strength (times) | Picking value | Stiffness |
| 32 | Hexamethylolmelamine. | Starch | 621 | 623 | 78.7 | 34.1 | 98.2 | No change | >15 | 188 | 131 |
| 33 | Methylolmelamine | do | 613 | 607 | 79.2 | 33.7 | 97.9 | do | >15 | 192 | 132 |
| 34 | Dimethylolethylene urea. | do | 625 | 625 | 81.1 | 32.4 | 97.6 | do | >15 | 173 | 131 |
| 35 | Monomethylol urea | Casein | 627 | 628 | 81.5 | 33.9 | 98.2 | do | >15 | 179 | 129 |
| 36 | Dimethylolpropylene urea. | do | 599 | 603 | 72.3 | 33.6 | 97.1 | do | >15 | 188 | 133 |
| 37 | N-butoxy-methyl N'-methylol urea. | do | 608 | 611 | 78.9 | 34.0 | 98.2 | do | >15 | 182 | 135 |

Note: The respective methods of measuring the viscosity, granularity, whiteness, gloss degree, light resistance, yellow change degree, wet rubbing strength, picking value and stiffnes in the above Table 2 were substantially the same as in the notes in Example 1.

What is claimed is:

1. A coating composition for paper comprising an aqueous mixture containing 100 weight parts pigment and 3 to 30 weight parts of a binder comprising a copolymer of 2 to 30 weight percent ethylene, 98 to 70 weight percent vinyl acetate, and 0 to 5 weight percent of an ethylenically unsaturated acid selected from the class consisting of acrylic, methacrylic, maleic, citraconic, fumaric and crotonic acids.

2. A coating composition as claimed in claim 1 wherein said copolymer comprises ⅙ to ⅗ of said binder and at least one member selected from the class consisting of 7. Composition claimed in claim 1 wherein said acid is maleic acid.

8. Composition claimed in claim 2 wherein said member is starch and said acid is acrylic acid.

9. Composition claimed in claim 2 wherein said member is casein and said acid is acrylic acid.

10. Composition claimed in claim 3 wherein said N-methylol compound is an N-methylolmelamine.

11. Composition claimed in claim 3 wherein said N-methylol compound is an N-methylolethylene urea.

12. Composition claimed in claim 3 wherein said N-methylol compound is an N-methylol urea.

13. Composition claimed in claim 3 wherein said N-methylol compound is an N-methylol propylene urea.

14. Composition claimed in claim 2 wherein said member is soybean protein and said acid is acrylic acid.

15. Composition claimed in claim 2 wherein said member is polyvinyl alcohol and said acid is acrylic acid.

16. Composition claimed in claim 2 wherein said member is starch and said acid is moleic acid.

17. Composition claimed in claim 2 wherein said member is casein and said acid is moleic acid.

References Cited

Lamar et al., Adhasion, 1962, 6, No. 12, 629–36.

WILLIAM H. SHORT, *Primary Examiner.*

E. M. WOODBERRY, *Assistant Examiner.*

Notice of Adverse Decisions in Interferences

In Interference No. 96,627 involving Patent No. 3,337,482, H. Watanabe, S. Takahashi, A. Shingyochi and N. Watanabe, ETHYLENE-VINYL ACETATE COPOLYMER PAPER COATING COMPOSITION, final judgment adverse to the patentees was rendered June 9, 1972, as to claims 1, 2, 3, 4, 5, 7 and 11.

[*Official Gazette March 27, 1973.*]